United States Patent Office 2,928,408
Patented Mar. 15, 1960

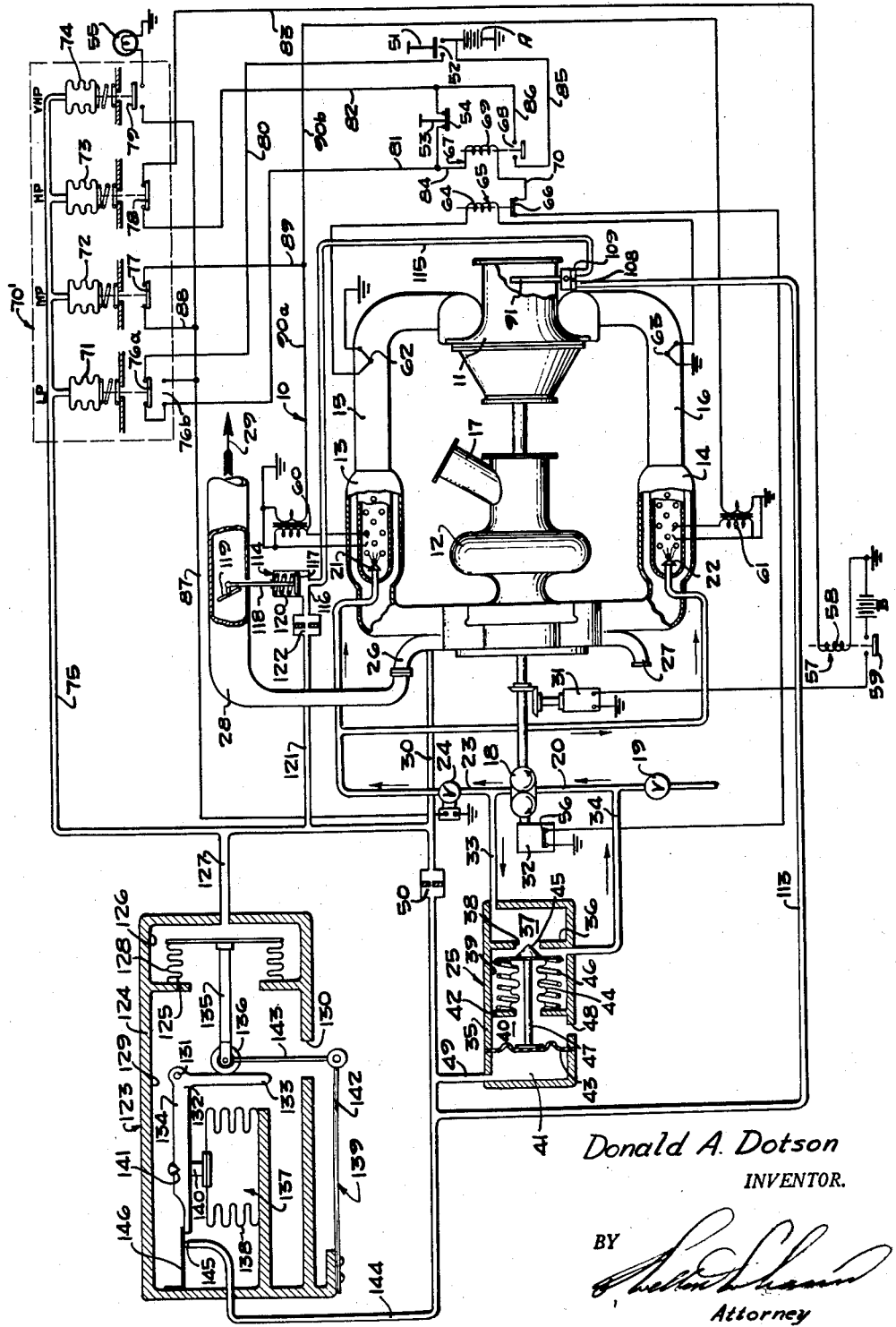

2,928,408

PNEUMATIC GOVERNOR

Donald A. Dotson, Los Angeles, Calif., assignor to The Garrett Corporation, Los Angeles, Calif., a corporation of California Original application March 13, 1951, Serial No. 215,207, now Patent No. 2,808,702, dated October 8, 1957. Divided and this application December 28, 1953, Serial No. 400,666

3 Claims. (Cl. 137—80)

The present invention relates generally to speed governing apparatus, and is more particularly concerned with a governor which may be utilized for controlling the speed of power plants, such as a gas turbine unit.

The present invention constitutes a division of my copending application, Serial No. 215,207, filed March 13, 1951, now issued in Patent No. 2,808,702.

Mechanical inertia governors of the fly-ball type are not adapted for the control of gas turbines under the conditions where it is desired that the speed shall increase with increased load up to maximum allowable speed with maximum load.

The present invention therefore contemplates a pneumatic governor arranged to control the power plant in accordance with the temperature compensated pressure ratio across the compressor. Since the design characteristics of any particular compressor are predicated to a very large extent on the ratio of the density of the inlet air to that at the outlet, it will be seen that by keeping this ratio fairly constant, the compressor will deliver highest efficiency over the range of air flows required.

Further objects of the invention will be brought out in the following part of the specification, wherein detailed description is for the purpose of fully disclosing the invention without placing limitations thereon.

Referring to the accompanying drawings, which are for illustrative purposes only, the single figure is a view diagrammatically illustrating a governor embodying the features of the present invention, and shows the manner in which it is incorporated in the fuel control system of a gas turbine power plant.

The power plant in general

Referring now generally to the drawings, the present invention is disclosed as being embodied in a power plant 10 in which a hot gas turbine 11 drives a compressor 12 having its outlet connected with dual combustion chambers 13 and 14 which are respectively connected through ducts 15 and 16 for conducting the hot gases to the turbine. Air supply to the compressor is through an inlet 17. Fuel for the combustion chambers is supplied from a fuel pump 18 driven by the turbine, this pump having its inlet connected to a suitable source of fuel supply through a shutoff valve 19 by a conduit 20. The pump outlet is connected with nozzles 21 and 22 in the combustion chambers by means of a conduit 23, fuel flow through this conduit being controlled by a solenoid valve 24 and a by-pass valve 25, as will hereafter be explained in detail.

The compressor 12 is provided with a plurality of bleed-off connections 26 and 27 from which compressed air may be distributed through suitable ducts to points of use for power purposes. In the present instance, the connection 26 is shown as being connected to a distribution duct 28 for supplying air, as indicated by the arrow 29, to remotely located air actuated apparatus, for example, an air turbine motor (not shown). The connection 26 is also shown as being connected with a branch conduit 30 by which air from the compressor outlet may be supplied to pneumatic control which will be described later in detail.

An electric starter 31 is shown as having a driving connection with the unit, and there is also provided a suitable over-speed switch 32, which are connected into the control system of the power plant, to be described.

Fuel supply and control system

As diagrammatically illustrated, the fuel system is a simple single flow line in which the supply conduit 20 connects with the inlet of the fuel pump 18, and an outlet connection conduit 23 connects with the nozzles of the combustion chambers. Control of the fuel supplied to the combustion chambers is accomplished by regulating the by-pass of fuel from the outlet side of the fuel pump 18 to its inlet side. For such purpose, the by-pass valve 25 is connected by a conduit 33 with conduit 23, and by conduit 34 which connects with conduit 20 on the inlet side of the pump. The by-pass valve 25 in addition to fuel metering, also acts as a safety device for the fuel system and forms a relief valve which will open under abnormally high pressure to by-pass fuel around the fuel pump.

The by-pass valve 25 comprises a casing 35 having a fixed wall 36 inwardly spaced from one end of the casing and cooperating therewith to provide a chamber 37 in communication with a flow opening 38 in the wall 36. Between the wall 36 and the opposite end of the casing 35, the interior of the casing is divided into separated chambers 39, 40 and 41 by movable wall structures 42 and 43.

The wall structure 42 comprises a bellows 44 which is anchored at one end and communicates interiorly with chamber 40, and is connected at its other end to a metering valve 45 operatively associated with the opening 38 and adapted to seat therein in closed position. A coil spring 46 supplements the action of the bellows 44 and acts to urge the valve towards seated position. The valve 45 is further connected by means of a stem 47 or other suitable structure with the movable wall structure 43 which in this instance has been illustrated as comprising a diaphragm.

The chamber 37 is connected to receive fuel pressure through conduit 33 from the outlet side of the fuel pump, while chamber 39 is connected with the inlet low pressure side of the pump by conduit 34. The chamber 40 communicates through a port 48 with atmosphere. The confronting faces of wall structures 42 and 43 are therefore subject to a common pressure, in this case atmospheric pressure. The chamber 41 is connected through a conduit 49 with the control pressure side of the pneumatic system supplied by conduit 30, a restricted orifice 50 being interposed in the flow path of the control air pressure to the chamber 41.

The effective area of the bellows 44 is made equal to the area of the opening 38, thereby providing constant pressure areas in all positions of operation of the valve 45. It will thus be seen that the ratio of the effective area of the wall structure 43 to the area of the orifice 38 establishes a substantially constant fuel-to-air ratio, since the control pressure established by means of the restricted flow from the compressor outlet acts on the diaphragm in the chamber 41 in a manner equivalent to a variable force which changes directly with compressor pressure changes. This variable force is augmented by the spring 46 which has a sufficient valve closing force to supply enough fuel pressure to the combustion chambers for initial light-off. Opening action of the metering valve 45 causes more fuel to be by-passed from the high pressure side to the low pressure side of the pump 18, and vice versa.

Pneumatic-electric starting and control system

Provision is made for automatically starting of the power plant through a combination of pneumatic and electrical components which provide compact, light-weight, small space occupying accessories. The various steps are properly coordinated and sequentially affected upon the closing of a starting switch 51 having normally open contacts 52. This switch, as well as a stop switch 53 having normally closed contacts 54, may be mounted at any desired location with respect to the power plant which it controls, and if desired may be located at a remote station such as the pilot's or flight engineer's station. This station may also include indicating lamps, as illustrated at 55, as necessary.

In addition to the main start and stop switches mentioned above, the other electrical components comprise normally closed contacts 56 of the over-speed device 32. The starting motor 31 is controlled through a starting relay 57 having an actuating coil 58 and normally open contacts 59. Combustion chamber ignition coils 60 and 61 are energizable to light-off the combustion chambers during starting.

Thermocouples 62 and 63 are respectively positioned in the hot gas ducts 15 and 16 leading to the turbine. These thermocouples are connected with opposed polarities in series with an actuating coil 64 of a differential relay 65, this relay having normally closed contacts 66. With this arrangement, it will be appreciated that so long as the temperatures of the hot gases from the combustion chambers are substantially equal, the voltages generated by the thermocouples will be substantially equal and in opposed relation. In the event that either of the combustion chambers should fail to light-off, an unbalancing will be established and current will be forced through the coil 64 of the relay 65 and cause it to open its contacts 66. Similar operation will take place in the event that one of the combustion chambers should inadvertently blow-out after operation has been initiated.

A holding relay 67 contains normally open contacts 68 and an actuating coil 69, one side of this coil being connected in an energizing circuit by a conductor 70 containing the contacts 66 and 56 therein in series relation.

Pneumatic components consist of a multiple differential pressure switch assembly 70'. This switch assembly contains a plurality of spring biased bellows 71, 72, 73, and 74 which are connected to a conduit 75 by which operating fluid pressure is supplied from conduit 30. The bellows 71 is associated with and actuates normally closed contacts 76a and normally open contacts 76b. Bellows 72 and 73 are associated with normally closed contacts 77 and 78, respectively, whereas the bellows 74 is operatively associated with normally open contacts 79.

The operation of the pneumatic-electric starting and control will now be described. A suitable source or sources of electric control current will be provided, as necessary, and may be taken from a suitable generator or battery. In the present instance, the electrical supply is shown as being from batteries A and B, respectively, these batteries having one terminal grounded.

In order to start the power plant, it is only necessary to depress the starting switch 51 so as to close its contacts. The starting motor 31 will now be energized by activation of the starting relay 57 through the following circuit: from one side of the battery A through contacts 52, conductor 80, contacts 76a, conductor 81, contacts 54 of the stop switch, conductor 82 through contacts 78, conductor 83 to one side of coil 58 of starting relay 57, and from the other side of this coil to ground. Energization of the starting relay 57 causes it to close its contacts 59 and connect the electric starter 31 to the battery B.

Simultaneously with the energization of the electric starter, the energizing coil 69 of holding relay 67 is energized through the following circuit: from the energized conductor 81, through conductor 84 to one side of the coil 69, from the other side of this coil through conductor 70, contacts 66 and thence through contacts 56 to the other side of the circuit. Energization of the relay 67 causes it to close its contacts 68 to form a bridging connection, from the battery A, through conductors 85 and 86, to conductor 82 of a holding circuit for the starting relay 57, this holding circuit being independent of the starting switch 51 which may now be released.

The electric starter 31 being thus energized will start the power plant and continue to accelerate its speed. As the speed increases, the compressor 12 will begin to build up pressure in the conduit 75. When this pressure has reached a predetermined value, for example, 10" H₂O gage, the bellows 71 expands to open its contacts 76a, and close its contacts 76b to complete an energizing circuit to the solenoid valve 24 as follows: from one side of the battery A through conductor 85, contacts 68, conductor 86, stop switch contacts 54, conductor 81, contacts 76b, and thence through conductor 87 to the actuating coil of solenoid valve 24, and to ground. Actuation of the valve 24 causes it to open and permit flow of fuel to the nozzles 21 and 22 of the combustion chambers.

Simultaneously with the energization of solenoid valve 24, the ignition coils 60 and 61 are energized through a circuit as follows: from the now energized conductor 87, through conductor 88, contacts 77, conductor 89, thence through branch conductors 90a and 90b to the respective primary windings of ignition coils 60 and 61, thence to ground.

Should one or the other of the combustion chambers fail to light-off, the differential relay 65 will operate to open its contacts and thus interrupt the energizing circuit of the holding relay 67, thus permitting it to drop out and open its contacts 68 in the energizing circuit of the starting relay 57, the solenoid valve 24, and the ignition coils 60 and 61.

Assuming ignition to be normal in both combustion chambers, the compressor continues to build up pressure. When this pressure reaches a predetermined value, for example, 45" H₂O gage, the medium pressure bellows 72 will expand to open its contacts 77 and interrupt the energizing circuit to the ignition coils; combustion of fuel in the combustion chambers now being self-sustaining.

The power plant continues to accelerate its speed under the action of the starter and turbine power until the compressor pressure reaches a predetermined higher value sufficient to cause the high pressure bellows 73 to open its contacts 78, whereupon the energizing circuit of the starting relay 57 is interrupted and the relay operated to open its contacts and de-energize the electric starter; the power plant at this time being wholly self-sustaining.

As the power plant comes up to operating speed, the compressor pressure causes the very high pressure bellows 74 to close its contacts 79 to energize the lamp 55 from the hot conductor 87, and thus inform the operator that the power plant is ready to deliver pneumatic power from the pressure air connections 26 and 27.

Over-speed switch 32 acts as a safety device by opening its contacts 56 in the energizing circuit of holding relay 67 in the event of excessive speed. The power plant may also be shut down by actuating the stop switch 53 so as to cause it to open its contacts. Since these contacts 54 are also in the energizing circuit of relay 67, the relay will shutdown the power plant in the same manner as in the case of over-speed.

Pneumatic governing and regulating system

Maximum acceleration of the turbine during starting operation will be obtained when the turbine nozzles are maintained at their allowable maximum operating temperature. For controlling the turbine nozzle temperature during the period when the power plant is accelerating from zero up to maximum speed during a starting operation, a thermostatic valve 91 is mounted in the turbine exhaust, this valve having a thermal sensitive control for modifying the operation of the by-pass valve 25 during starting. It will be appreciated that the turbine exhaust temperature will reflect the turbine nozzle temperatures. A fitting 108 of the thermal valve 91 is connected to the control pressure system, and hence to chamber 41 of by-pass valve 25, by means of a conduit 113. Therefore, when excessive temperature obtains at the turbine nozzles, the valve 91 relieves control system pressure in the chamber 41, causing the fuel metering valve 45 to unseat a greater distance and allow fuel pressure on the high side of the fuel pump to force a greater amount of fuel through the pump by-pass. As a result, fuel flow to the combustion chambers is decreased with a consequent reduction of temperature at the turbine nozzles. Upon decrease of temperature at the turbine nozzles below the maximum allowable temperature, the opposite action takes place.

After the power plant is up to speed and pneumatic power is available, the thermostatic valve 91 cooperates with a load limiting servo-valve 114 in a manner to limit the pneumatic load to values consistent with maximum desirable temperature at the turbine nozzles. For this purpose, a fitting 109 of the thermal valve 91 is connected by means of a conduit 115 to the operating cylinder 116 within which an operatively associated piston 117 is mounted for reciprocal movement. The piston is connected by a link 118 to a butterfly valve 119 for controlling flow through the duct 28. A spring 120 acts against the piston in a direction to move the butterfly valve towards closed position. Motivating air pressure is supplied to the cylinder 116 from conduit 30 through a conduit 121 having a flow restricting orifice 122 therein.

It is preferred that the mechanism of the thermostatic valve 91, which controls the pressure in the load limiting control conduit 115, be calibrated so as to operate at a temperature of, for example, 100° F., under that which controls the pressure in the by-pass valve control conduit 113. This permits both the acceleration and speed controls to operate the fuel by-pass valve 25 so as to maintain maximum temperature at the nozzle box at all times regardless of the amount of pneumatic load on the power plant. It also permits load modulation by the butterfly valve without interference by the acceleration control of the pneumatic control circuit at the governed speed.

It will be appreciated therefore that during the accelerating phase of starting, the operation of the power plant is under the supervision of the acceleration control. Since the compressor pressure increases roughly as the square of its speed, the compressor pressure will rise rapidly as designed speed is approached, this increase being accompanied by a corresponding increase in fuel pressure. During the later speeds of acceleration, the nozzle temperature, which increased rather abruptly in the initial starting phase, will begin to drop off. Thus, the acceleration control thermostat becomes less controlling, and as no load designed speed is approached, the thermostatic valve will only function as a standby control with conduits 113 and 115 sealed off.

The load limiting control is ineffectual during the accelerating period of the power plant, since no load has been applied. When load is applied, the thermostatic valve 91 will act to modulate the amount of bleed air available for that load in accordance with a nozzle temperature of approximately 100° F., under that at which the acceleration control would operate as previously discussed.

It is, of course, desirable that the butterfly valve 119 should be located as closely to the connection 26 of the compressor as is practicably feasible, since any leakage which might occur in the distribution duct 28 between the connection 26 and the butterfly valve 119 might not result in temperature limiting control by the butterfly valve. In that event, the operation of the by-pass valve 25 by the thermostatic valve 91 would be the sole means for limiting nozzle temperatures.

The rotational speed of the power plant is under the control of a pneumatic governor which will now be described. The pneumatic governor according to the present invention is generally designated by numeral 123. The governor comprises an enclosing casing 124 within which a movable wall structure 125 is positioned adjacent one end of the casing with which it cooperates to form a chamber 126 which is connected through a conduit 127 to receive operating pressure from the conduit 30.

The movable wall structure 125 includes a differential bellows 128 mounted within the chamber 126, the interior of this bellows being open on its opposite side to pressure existing within a chamber 129 extending between the movable wall structure and the opposite end of the casing, this chamber being vented to atmosphere through a port opening 130.

Within the chamber 129 there is pivotally mounted on a pivot member 131 a right angled crank 132 having arms 133 and 134 respectively. Movement of the bellows 128 is transmitted to the crank 132 through a thrust bar 135, one end of this bar being attached by a suitable connection to the bellows structure, and the other end of the bar carrying an anti-friction contact wheel 136 which bears against an adjacent surface of the arm 133. Thrust forces exerted by the bellows 128 will act to move the crank 132 in a clockwise direction.

Movements of the crank 132 by the action of the bellows 128, are modified by the action of an absolute pressure device 137 which consists of an evacuated bellows 138 and a temperature compensating mechanism 139. The action of the bellows 138 is transmitted to arm 134 of the crank through a tension bar 140 having a knife edge bearing contact 141 with the crank arm, so that tension forces applied thereto will act to swing the crank in a counterclockwise direction.

The effective pressure areas of the bellows 128 and 138 are equal. However, the moments of force acting on the arms 133 and 134 will be proportional to the relative lengths of the force arms and the pressures to which these bellows may be subjected under varying ambient conditions.

The crank and bellows combination described above would provide constant speed control of the power plant in accordance with changes of pressure at the compressor inlet, assuming inlet air temperature as being constant. However, it is a characteristic of this type of power plant, with merely pressure ratio control, that its speed decreases with decrease of inlet air temperature. Temperature compensation is therefore arranged by utilizing a bimetallic strip 142, this strip being anchored at one end and having its free end connected through a link 143 with the end of the thrust bar 135 which carries the contact wheel. The operation of the bimetallic strip is such as to vary the force arm at which the bellows 128 acts on the crank arm 133 in such a manner as to increase the pressure ratio with decrease of temperature. In other words, upward movement of the strip 142 accompanies a temperature decrease and causes a decrease in the length of the force arms between the crank pivot 131 and the point of contact with the wheel 136.

The mechanism as described above provides movement of the crank 132 in accordance with pressure ratio changes as corrected for by any temperature changes. By changing the fixed characteristic correction of the bimetallic strip 142, any desired operation of the power plant may be obtained. That is, the power plant may be given a constant speed or even an increasing speed characteristic with decreasing temperature at the inlet of the compressor. It is preferred, of course, that the bimetallic strip be located in or adjacent to the compressor inlet of the power plant so as to correctly sense the inlet air temperature.

The movements of the crank 132 are utilized in the speed control of the power plant by being associated with a suitable bleed conduit 144 arranged to bleed pressure from the chamber 41 of the by-pass valve 25.

The conduit 144 has an end which terminates within the chamber 129 of the pneumatic governor housing, this end being formed to provide a seat 145 for a reed valve member 146 which is normally closed against the seat 145. The free end of the valve member overlies an adjacent end of crank arm 134 so that upon clockwise movement of the crank 132, the valve member 146 will be lifted from its associated seat and permit bleed flow from the chamber 41 of the by-pass valve through the conduit 144. The valve member 146 has sufficient spring resiliency to seal against escape of control pressure air, until moved by the associated crank arm.

It will be appreciated that changes of compressor pressure between low load and full load are only nominal, when the power plant is running at governed speed. Therefore, the differential bellows 128 necessarily provides sensitive control of the reed valve member 146 in order to provide constant speed at the particular load. During power delivery periods, the thermostatic valve 91 operates primarily as a load limiting modulator, with a further standby protection feature against excessive fuel consumption, and in such an event the thermal valve overrides the action of the governor where excessive nozzle temperature might result from governor action.

It is appreciated that various modifications may suggest themselves to those skilled in the art without departing from the spirit of the present invention, and, hence, it is desired that the invention shall not be restricted to the form or forms shown or uses mentioned, except to the extent indicated in the appended claims.

I claim:

1. A pneumatically actuated governor for regulating fuel flow to an internal combustion engine, comprising: a casing; means defining a passage for controlling actuating air pressure of fuel control means, said passage having a restricted flow orifice; a valve in said casing for controlling said passage, said valve being on one side of said orifice; a first movable wall in said casing responsive to pressure differential between a variable fluid pressure and ambient atmosphere; a second movable wall in said casing responsive to absolute pressure variations, said walls being interconnected for mutual modifying operation; means for transmitting cooperative movement of said walls to said control valve to actuate the same; means for compensating the cooperative movement of said walls for variation in ambient temperature; and an adjustable bleed connection communicating with said passage on said side of said orifice.

2. A pneumatically actuated governor for regulating fuel flow to an internal combustion engine, comprising: a casing; means defining a passage for controlling actuating air pressure of fuel control means; a valve in said casing for controlling said passage; a first movable wall in said casing responsive to pressure differential between a variable fluid pressure and ambient atmosphere; a second movable wall in said casing responsive to absolute pressure variations; a pivoted crank having angularly positioned legs connected respectively with said walls; and temperature responsive means for shifting the connection of the first wall with respect to its associated crank leg.

3. A pneumatically actuated governor for regulating fuel flow to an internal combustion engine, comprising: a casing; means defining a passage for controlling actuating air pressure of fuel control means; a valve in said casing for controlling said passage; a first movable wall in said casing responsive to pressure differential between a variable fluid pressure and ambient atmosphere; a second movable wall in said casing responsive to absolute pressure variations; a pivoted crank having angularly positioned legs connected respectively with said walls, the connection with the first wall being a rolling connection; and a bimetallic strip for shifting said rolling connection in response to temperature changes.

References Cited in the file of this patent

UNITED STATES PATENTS

| | | |
|---|---|---|
| 2,295,728 | Gess | Sept. 15, 1942 |
| 2,422,808 | Stokes | June 24, 1947 |
| 2,601,777 | Woodward | July 1, 1952 |